May 7, 1935.   W. H. HEISE   2,000,229
DEVICE TO LEVEL BODY OF A TILTED CHASSIS
Filed June 12, 1929   2 Sheets-Sheet 1

INVENTOR
William H. Heise
BY
ATTORNEY.

May 7, 1935.  W. H. HEISE  2,000,229
DEVICE TO LEVEL BODY OF A TILTED CHASSIS
Filed June 12, 1929  2 Sheets-Sheet 2

INVENTOR
William H. Heise
BY
ATTORNEY

Patented May 7, 1935

2,000,229

UNITED STATES PATENT OFFICE 2,000,229

DEVICE TO LEVEL BODY OF A TILTED CHASSIS

William H. Heise, Los Angeles, Calif., assignor to Big Rock Ranch Company, Los Angeles, Calif., a corporation of California Application June 12, 1929, Serial No. 370,427

10 Claims. (Cl. 296—16)

My invention relates to a means for leveling the body of a vehicle which is supported on an inclined surface.

A device of my invention is particularly adapted to hearses of the side-loading type in which means is provided for loading a casket into a side of the hearse body. This means consists of a casket-supporting platform which is movable from a retracted position in the hearse body to an extended position, in which position it extends outwardly from the hearse body at right angles to a vertical axis thereof. When such a hearse is parked adjacent a curb of a crowned street, the inclination of the street causes the hearse body and the casket-supporting platform to decline to the right. When loading a horizontally carried casket onto the platform, the front end of the casket contacts the platform and interferes with the loading. This is objectionable during funerals as it causes confusion and mars the solemnity of the occasion.

It is an object of my invention to provide a means for leveling the body of a vehicle which is supported on a surface inclined to the horizontal. When my invention is applied to a side-loading hearse, it permits a casket-supporting platform thereof to be leveled so as to facilitate loading of a casket thereon.

It is another object of my invention to provide a means whereby the springs on a vehicle chassis may be compressed or expanded so as to level the chassis and the vehicle body secured thereto.

It is a further object of my invention to provide a leveling means for a vehicle which may be operated from the driver's compartment.

It is also an object of my invention to provide a leveling device which may be installed on a vehicle without requiring a special construction of the vehicle body or chassis.

Further objects of my invention will be evidenced from the ensuing description.

In the accompanying drawings in which I have shown a preferred form of my invention:

Figure 3:
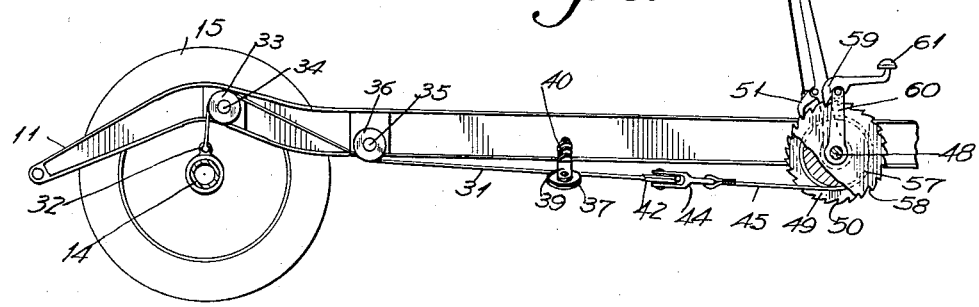
Fig. 3 is a side view of the vehicle chassis shown in Fig. 2.
Figure 2:
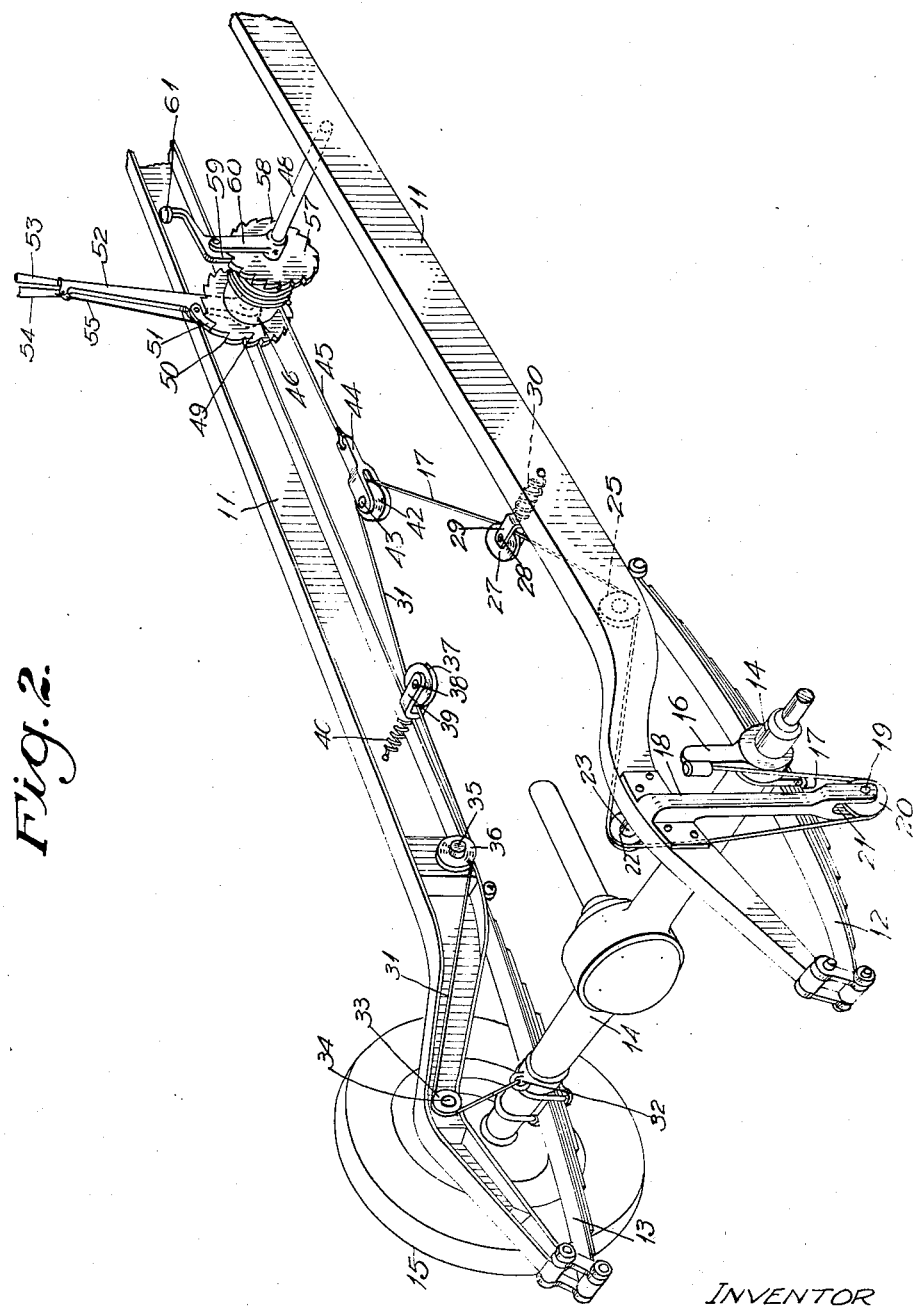
Fig. 2 is a view from above a vehicle chassis equipped with a device of my invention.

Figs. 2 and 3 of the drawings show a vehicle chassis which consists of a frame 11 supported on resilient members in the form of springs, a right, rear spring 12 and a left, rear spring 13 being carried on an axle housing 14 supported by wheels 15. On the chassis I have provided a leveling device of my invention which consists of an upwardly extending bracket 16 secured to the right side of the axle housing 14 outside of the spring 12. Secured to the upper end of the bracket 16 is a flexible connecting member or cable 17 which extends downwardly therefrom. Secured to the frame 11 in longitudinal alignment with the bracket 16 is a depending arm 18, the lower end of which extends below the upper end of the bracket 16 and carries a horizontal pin 19 on which is rotatably carried a pulley 20 in a vertical slot 21. The cable 17 passes under the pulley 20 and upwardly inside the frame 11. On the inside of the frame 11, in transverse alignment with the arm 18, is rotatably supported a pulley 22 on a horizontal pin 23 which is secured to the frame 11. The cable 17 passes upwardly and over the pulley 22 and forwardly under a pulley 25 which is rotatably carried on a pin 24 supported by the frame 11 forwardly of the pulley 22. Forward of the pulley 25 is a horizontal pulley 27 rotatably carried on a pin 28 in a yoke 29 resiliently secured to the frame 11 by a spring 30.

On the left side of the frame 11 a cable 31 is fastened to a ring 32 secured to the axle housing 14 adjacent the spring 13. The cable 31 passes upwardly and over a pulley 33 which is rotatably supported on a pin 34 secured to the frame 11 on the opposite side and in transverse alignment to the pulley 22. On the frame 11 on the opposite side from and in transverse alignment with the pulley 25 is secured a pin 35 which rotatably carries a pulley 36 under which the cable 31 passes. The cable 31 passes forwardly and around a pulley 37 rotatably carried on a pin 38 in a yoke 39 which is resiliently secured to the frame 11 by a spring 40 attached to the frame 11 on the opposite side from and in transverse alignment with the spring 30.

The forward ends of cables 17 and 31 pass around a pulley 42 and are connected together to form a continuous cable. The pulley 42 is rotatably supported on a pin 43 carried by a yoke 44 to the forward end of which is secured a cable 45. The cable 45 passes forwardly and is wound around the drum portion of a winch 46 which is rotatably supported on a shaft 48 secured to the frame 11 below the driver's compartment. Rigidly secured to the left side of the winch 46 is a ratchet wheel 49, teeth 50 of which are engaged by a dog 51 pivotally secured to an operating lever 52 which is rotatably supported on the shaft 48. The upper end of the operating lever 52 extends into the driver's compartment so as to be operable by the driver, and the end thereof is formed into a handle 53. Adjacent the handle 53 is a releasing grip 54 pivotally secured to the operating lever 52 and connected by a rod 55 to the dog 51.

To the right side of the winch 46 is rigidly secured a ratchet wheel 57, teeth 58 of which are engaged by a dog 59 rotatably supported by an arm 60 rigidly secured to the shaft 48. An extension of the dog 59 is formed into a releasing handle 61.

This form of my device is manually operable by the operating lever 52 through the engagement of the dog 51 with the teeth 50 on the ratchet wheel 49, which rotates the winch so as to wind up the cable 45 thereon. The winch 46 is normally prevented from unwinding by the engagement of the dog 59 with the teeth 58 on the ratchet wheel 57. The cable 45 may be unwound from the winch 46 by depressing the releasing handle 61 on the dog 59, thereby disengaging the dog 59 from engagement with the teeth 58 of the ratchet wheel 57. This constitutes a well known form of power device.

When the cable 45 is wound on the winch 46, the yoke 44 and pulley 42 are moved towards the front of the frame 11. This exerts a force on the cables 17 and 31 which, in turn, exert a force on the members to which the ends of the cables 17 and 31 are secured. The end of the cable 31, which is secured to the ring 32, exerts a tension force between the axle housing 14 and the frame 11, which compresses the spring 13 on the left side of the frame 11. The end of the cable 17 which is secured to the upper end of the bracket 16 exerts a tension force between the upper end of the bracket 16 and the pulley 20 which is secured to the lower end of the arm 18.

As the upper end of the bracket 16 is positioned above the lower end of the arm 18, there is produced an upward force on the arm 18 and a downward force on the bracket 16, which expands the spring 12 on the right side of the frame 11. The result of compressing the spring 13 on the left side of the frame 11 and expanding the spring 12 on the right side thereof is to move the left side of the frame 11 downwardly and the right side thereof upwardly, which inclines the frame 11 with respect to the axle housing 14. In case the wheels 15 are supported on a surface which declines to the right, such as the right side of a crowned street, the chassis of the vehicle may be leveled by the operation of the device of my invention. The degree of inclination of the frame 11, with respect to the axle housing 14, is variable so as to be adapted to various inclinations of supporting surfaces and is varied by adjusting the amount of the cable 45 which is reeled on the winch 46.

Figure 4:
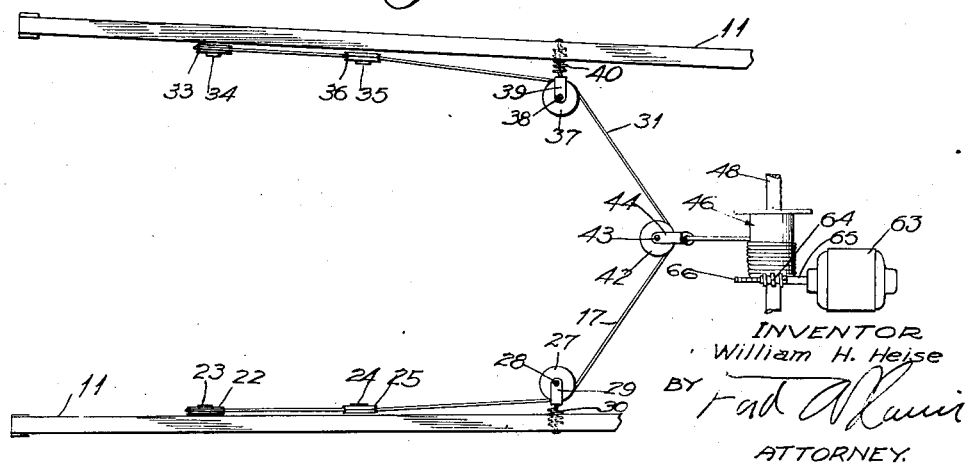
Fig. 4 is a view of an alternative form of operating device for my invention.

Fig. 4 shows an alternative form of power device in which an electric motor 63 is employed in place of the manually operated mechanism previously described. The electric motor 63 has a worm gear 64 attached to the motor shaft 65 which drives a gear 66 secured to the winch 46. All other parts of this form are identical with those of the preferred form. The electric motor 63 may be controlled by suitable switches disposed in the driver's compartment of the vehicle and provides a means for reeling the cable 45 on the winch 46 so as to incline the frame 11 with respect to the axle housing 14.

The winch 46 and associated operating mechanism constitute the power-operating means whereby the flexible connecting members or cables 17 and 31 are operated to flex the resilient members or springs 12 and 13 in order to level the vehicle frame 11. The pulleys constitute guiding members for the cables 17 and 31.

Figure 1:
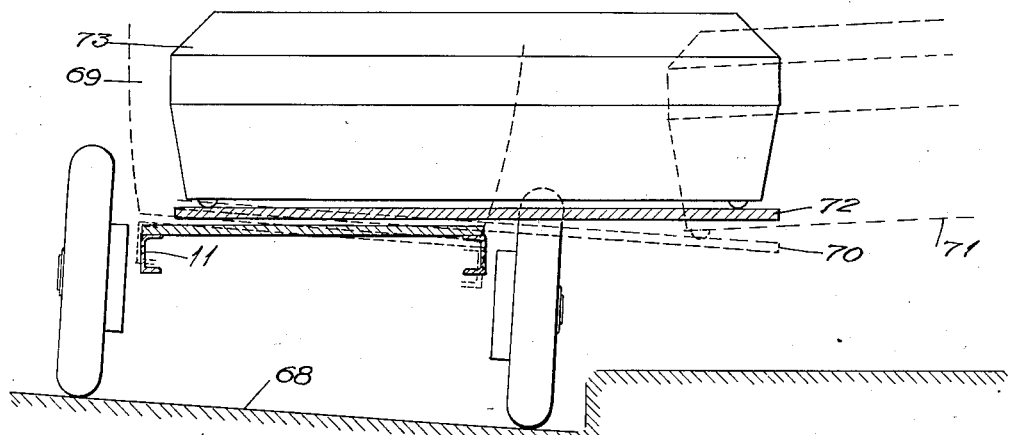
Fig. 1 is a view showing the utility of my invention when applied to a side-loading hearse.

Fig. 1 shows a side-loading hearse equipped with a leveling device of my invention. The hearse is shown as parked on the right side of a crowned street 68 for loading. When the hearse body 69 is allowed to assume its normal position and is not leveled, a casket-supporting platform is extended out of the hearse body as shown by the dotted lines 70. The front end of a horizontally carried casket is shown by dotted lines 71 as contacting the top of the platform 70, which thus interferes with the loading. When the body 69 is leveled with a device of my invention, the platform is also leveled and extends from the body 69, as shown by the full lines 72. A casket 73 is easily loaded thereon as shown in the drawings.

From the above it will be evident that the device of the present invention includes a frame tilting arrangement associated with the axle which is connected to the frame by the usual yielding or spring suspension means, and it is to be observed that the tilting means includes an elevating cable 17 between the axle and one side of the frame and a depressing cable 31 between the axle and the opposite side of the frame with these cables joined to form a compensating cable loop, an intermediate portion of which is engaged and pulled by the power means so as to elevate one side of the frame and simultaneously depress the other side relative to the axle.

Particularly when the power means is released and the tilting means idle, this compensating cable loop may freely "see-saw" through the several pulleys. This idle movement of the elevating and depressing cables permits free automatic tilting and rebound of the frame and axle during normal road travel of the vehicle. When the tilting mechanism is operated by the power means, it will be understood that by reason of the compensating cable loop the power applied to the opposite sides of the frame and axle will be equalized through this compensating connection. Thus, while the tilting mechanism is at all times connected to the frame and axle and is available for use to tilt the frame to a desired angle, its compensating connection is capable of idle movement, enabling the usual free automatic action of the spring suspension incident to road travel.

My device may be installed on a standard vehicle without requiring special factory construction as all parts of the device are fastened to standard parts of the vehicle chassis without requiring the chassis to be modified. My device is also adapted to incline the vehicle body in other directions if required, and various other modifications can be made without departing from the spirit of my invention.

I claim as my invention:

1. In a vehicle adapted to operate on a supporting surface, the combination of: a frame; a first resilient member secured to one side of said frame; an opposite resilient member secured to a second side of said frame; an arm secured at one end to said one side of said frame, an unattached end of said arm extending beyond said first resilient member; a first flexible connecting member connecting said first resilient member and said unattached end of said arm; a second flexible connecting member connecting said opposite side of said frame and said second resilient member; and operating means for producing a force in said first and second flexible connecting members whereby said first resilient member is expanded and said second resilient member is compressed.

2. In a vehicle, the combination of: a frame; a first resilient member secured to one side of said frame; an opposite resilient member secured to an opposite side of said frame; an arm secured at one end to said one side of said frame, having an unattached end thereof extending beyond said first resilient member; a first guiding member secured to said unattached end of said arm; a second guiding member secured to said opposite side of said frame at a point adjacent said second resilient member; and a flexible connecting member having an end thereof connected to said first resilient member and an end thereof connected to said second resilient member, said flexible connecting member being guided by said first and said second guiding members.

3. In a vehicle, the combination of: a frame; a first resilient member secured to one side of said frame; a second resilient member secured to an opposite side of said frame; an arm secured at one end to said one side of said frame, having an unattached end thereof extending beyond said first resilient member; a first guiding member secured to said unattached end of said arm; a second guiding member secured to said opposite side of said frame at a point adjacent said second resilient member; a flexible connecting member having an end thereof connected to said first resilient member and an end thereof connected to said second resilient member, said flexible connecting member being guided by said first and said second guiding members; and operating means for producing a force in said flexible connecting means whereby said first resilient member is expanded and said second resilient member is compressed.

4. In a vehicle, the combination of: a body secured to a frame; a platform associated with said body and adapted to be extended laterally therefrom; a wheeled structure including an axle; a first resilient member secured to one side of said frame and supporting one side of said frame on said wheeled structure; a second resilient member secured to the opposite side of said frame and supporting that side of said frame on said wheeled structure; an arm attached to said frame adjacent said first resilient member; a first flexible connecting member flexible throughout its length connecting said axle and said arm; a second flexible connecting member flexible throughout its length connecting said opposite side of said frame and said axle; and means for operating said first and second flexible connecting members whereby said first resilient member is expanded and said second resilient member is compressed to tilt said body relative to said wheeled structure so that said platform is leveled when in extended position.

5. A combination as described in claim 4 in which said arm depends beyond said first resilient member.

6. In a vehicle adapted to operate on a supporting surface, the combination of: a frame; a first resilient member secured to one side of said frame; a second resilient member secured to an opposite side of said frame, said resilient members supporting said frame on an axle; an arm secured at one end to one side of said frame, an unattached end of said arm extending beyond said first resilient member; a first flexible connecting member connecting said axle and said unattached end of said arm; a second flexible connecting member connecting said opposite side of said frame and axle; and power means adapted to operate said flexible members to transaxially tilt said frame.

7. A combination as described in claim 6 in which said arm depends below said first resilient member.

8. A combination as described in claim 6 in which said power means comprises a mechanically rotated drum adapted to increase or decrease the tension in said flexible members.

9. In a vehicle, the combination of: a frame adapted to support a body by providing a structure to which the body may be secured; an axle adapted to provide a friction reducing support for said frame by providing means upon which wheels may be carried; two springs, one situated on one side of said frame and the other situated on the other side of said frame, said springs being each adapted to provide a resilient support between said axle and said frame by suitable connections between said axle and said frame; a cable adapted to change the position of said frame with relation to said axle by drawing one side of said frame towards said axle and forcing the other side of said frame away from said axle; a pulley through which said cable passes, said pulley being adapted to put a tension on said cable by applying a force to the portion of the cable passing through said pulley; and means by which an operator can change the position of said frame with relation to said axle by changing the force so applied by said pulley to said cable.

10. In a vehicle, the combination of: a frame adapted to support a body by providing a structure to which the body may be secured; an axle adapted to provide a friction reducing support for said frame by providing means upon which wheels may be carried; two springs, one situated on one side of said frame and the other situated on the other side of said frame, said springs being each adapted to provide a resilient support between said axle and said frame by suitable connections between said axle and said frame; a cable adapted to change the position of said frame with relation to said axle by drawing one side of said frame towards said axle and forcing the other side of said frame away from said axle; a pulley through which said cable passes, said pulley being adapted to put a tension on said cable by applying a force to the portion of the cable passing through said pulley; means by which an operator can change the position of said frame with relation to said axle by changing the force so applied by said pulley to said cable; and locking means controlled by an operator and adapted to lock said frame in position with relation to said axle by locking said pulley in any position to which it may be moved.

WILLIAM H. HEISE.

CERTIFICATE OF CORRECTION.

Patent No. 2,000,229. May 7, 1935.

WILLIAM H. HEISE.

It is hereby certified that error appears in the printed specification of the above numbered patent requiring correction as follows: Page 2, second column, line 65, claim 1, for "an opposite" read a second; and line 66, of said claim, for "a second" read an opposite; and page 3, first column, line 6, claim 2, for "an opposite" read a second; and that the said Letters Patent should be read with these corrections therein that the same may conform to the record of the case in the Patent Office.

Signed and sealed this 25th day of June, A. D. 1935.

Bryan M. Battey
Acting Commissioner of Patents.

(Seal)